United States Patent [19]

Streit et al.

[11] Patent Number: 4,821,378
[45] Date of Patent: Apr. 18, 1989

[54] FISH HOLDER THIMBLE

[76] Inventors: Stanley Streit; Mary Streit, both of R.R. #1, Box 94, Avon, Minn. 56310

[21] Appl. No.: 87,808

[22] Filed: Oct. 19, 1987

[51] Int. Cl.⁴ .................................. A22C 25/08
[52] U.S. Cl. ............................. 17/66; 17/70
[58] Field of Search ........................ 17/66, 70

[56] References Cited

U.S. PATENT DOCUMENTS

| 1,006,367 | 10/1911 | Dittmar | 17/66 X |
| 2,895,139 | 7/1959 | Compton | 17/66 X |
| 3,181,198 | 5/1965 | Stelzen | 17/70 |
| 4,615,078 | 10/1986 | Teich | 17/66 |

Primary Examiner—Willie G. Abercrombie

[57] ABSTRACT

A frusto-conical thimble-like element, open at both ends, is provided with plural teeth and in use is positioned onto one's thumb, thumb pressure being applied to a fish to cause the teeth to project into and secure the fish during processing.

1 Claim, 2 Drawing Sheets

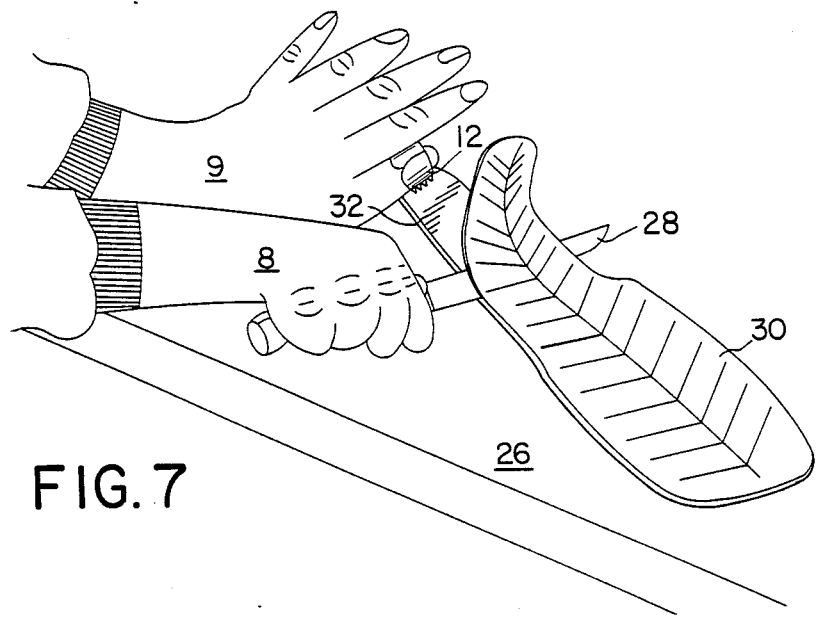
FIG. 7
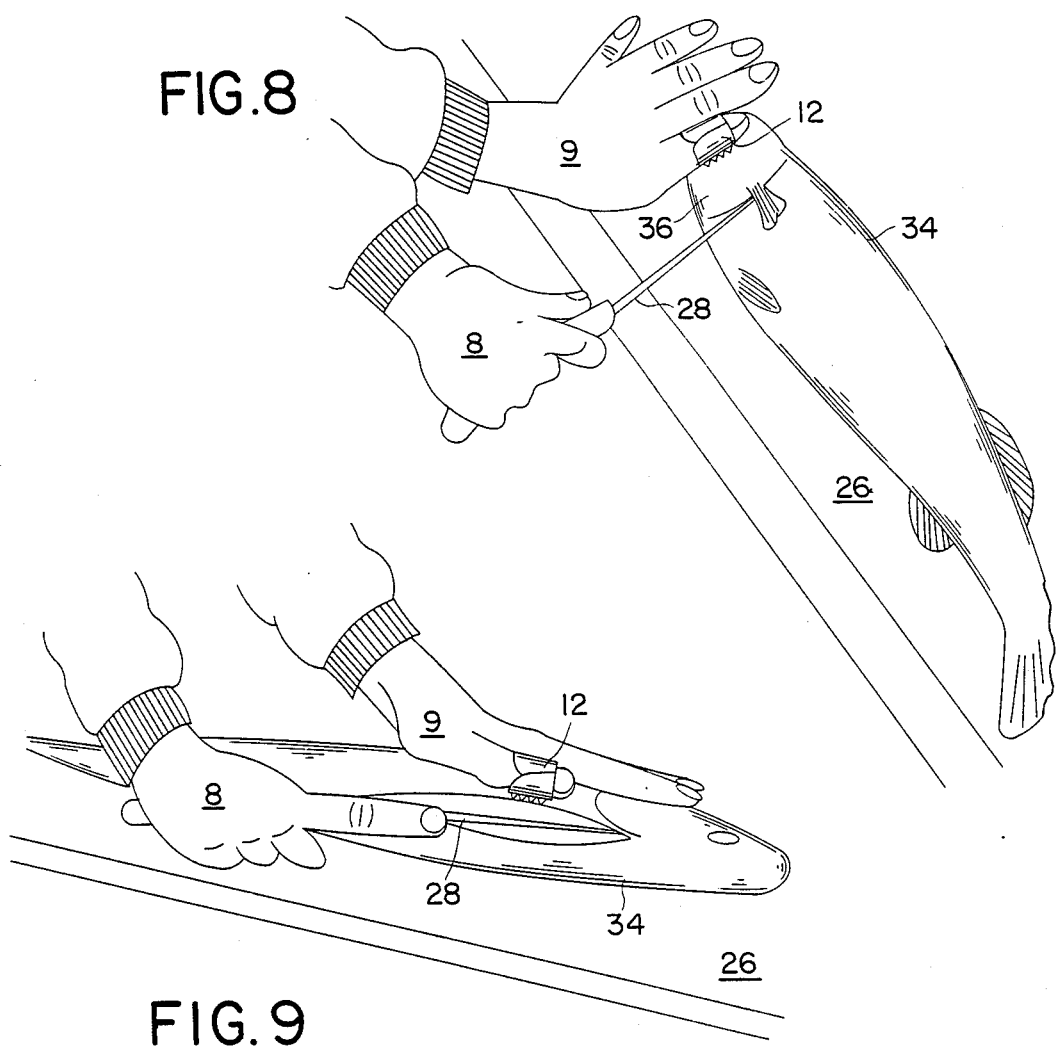
FIG. 8
FIG. 9

FISH HOLDER THIMBLE

BACKGROUND OF INVENTION

1. Technical Field

This invention allows the user to grip the fish and allows the user to stabilize the fillet by pressing the teeth of the thimble through the fillet into a cutting surface. The advantage is that the user does not have to lift the fish fillet from the cutting surface while removing skin from the fillet. This allows users to fillet the fish with less loss of fish flesh. This invention is so designed so as once placed upon users thumb there is no chance of loosening or losing while maneuvering during butchering process.

2. Description of Background Art

Other devices have been devised for the gripping and cleaning of fish. These devices are limited in their use. All other devices require use of the thumb and other fingers for gripping of fish. This device allows easier positioning as the thumb is used and other fingers can be kept clear of the knife's cutting edge as shown in FIG. 7. The use of the thumb only gives the user more freedom of movement without fear of slippage or injury. This invention is durable, simple to use and improved over all other similar devices.

SUMMARY OF INVENTION

The thimble is formed from a strip of 20 gauge galvanized metal or other suitable material. The metal is punched out to form "V" shaped teeth as shown in FIGS. 1, 2, and 4. The metal is then wrapped to form a frusto-conical element open at both ends and adapted to fit over the users thumb. The thimble will be manufactured in several different sizes and can be made to fit either the left or right thumb. The thimble can perform multiple uses as shown in FIGS. 7, 8, and 9. The basic purpose of this invention is to provide a durable, low cost, efficient means of assisting fishermen in the filleting of various species of fish.

BRIEF DESCRIPTION OF THE DRAWINGS

FIG. 7 Thimble holding skin, while the knife is skinning off the fillet.

FIG. 8 Thimble anchoring head while filleting process begins.

FIG. 9 Thimble holding fillet away from backbone of fish.

DESCRIPTION OF PREFERRED EMBODIMENT

Figure 1:
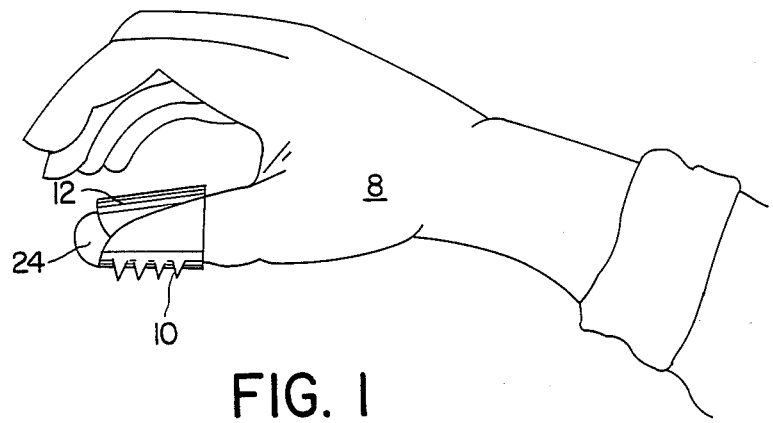
FIG. 1 Fillet thimble shown on right hand as would be done for a left handed person FIG. 2 Shows top view of the pattern development before the thimble has been shaped.

Referring to FIG. 1 of the drawing, the thimble 12 is positioned on the right hand 8. The four equally spaced teeth 10 are shown in the downward position. The thumb 24 is projecting through the thimble which gives the user full mobility of the hand.

Figure 2:
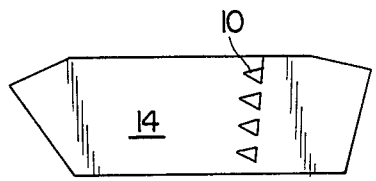

Referring to FIG. 2 shows the pattern development 14, which would be made of approximately 20 gauge sheetmetal or suitable type of material. The teeth are angled at 85° so once the thimble is formed they will line up straight downward. All the sizes are given to show the approximate size or the thimble before being shaped.

Figure 3:
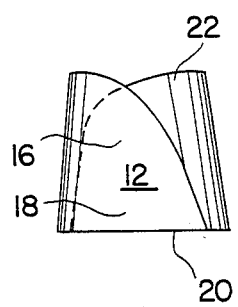
FIG. 3 Shows top view of the formed thimble.

Referring to FIG. 3, showing the lapped area 16 and where the thimble 12 will be fastened 18 by spotwelding or any other suitable method. The thumb enters 20 the thimble 12 and where the thumb exits 22.

Figure 4:
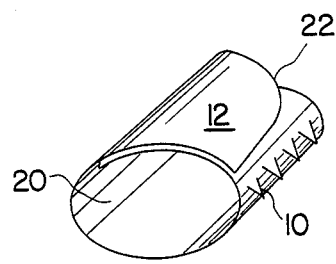
FIG. 4 Pictorial view of the thimble highlighting the teeth projection downward.
Figure 5:
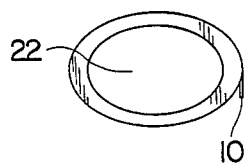
FIG. 5 Highlights the fron view showing the hole going through the thimble and its downward projections, of the teeth.
Figure 6:
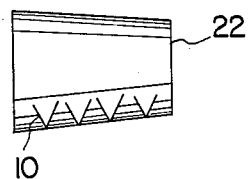
FIG. 6 Side view showing the size and location of its teeth; and showing the frusto-conical shape from the front and back.

Referring to FIG. 4, is a pictorial view highlighting the inside of the thimble 12. The thimble is drawn to be placed on the left hand as would be done for a right-handed person. (Note, it would be opposite for a left-handed person). Forming would be a mirror image of the pattern development 14 (as shown in FIG. 2).

Referring to FIG. 7, the thimble 12 is placed on the left hand 9 as would be used by a right-handed person. The thimble is firmly embedded through the skin 32 and into the surface 26. The right hand 8 shows the knife 28 removing the flesh 30 from the skin 32.

Referring to FIG. 8, this figure shows thimble 12 being used on left hand 9 with thimble 12 being embedded into cheek 36 of said fish 34. This hold is used to stabilize fish 36 while knife 28 is used to make cuts severing fillet 30 from head portion of fish 34, same hold is effective in anchoring fish while scaling.

Referring to FIG. 9, thimble 12 embedded on side of fish 34 and with downward and slightly backward pressure, the fillet 30 is being lifted away from skeleton of fish 34 to give user full view of each cut with knife 28.

I claim:

1. A fish gripper made from a flat strip of material having an inner surface and an outer surface, a plurality of teeth projecting from said outer surface, said strip being rolled so as to define a substantially frusto-conical member, open at both ends and with said inner surface adapted to fit about a person's thumb, wherein downward pressure by the thumb forces said teeth into the fish to secure same during processing.

* * * * *